(Model.)
H. J. GLEASON.
COMBINED MOP HEAD AND WRINGER.
No. 551,625. Patented Dec. 17, 1895.
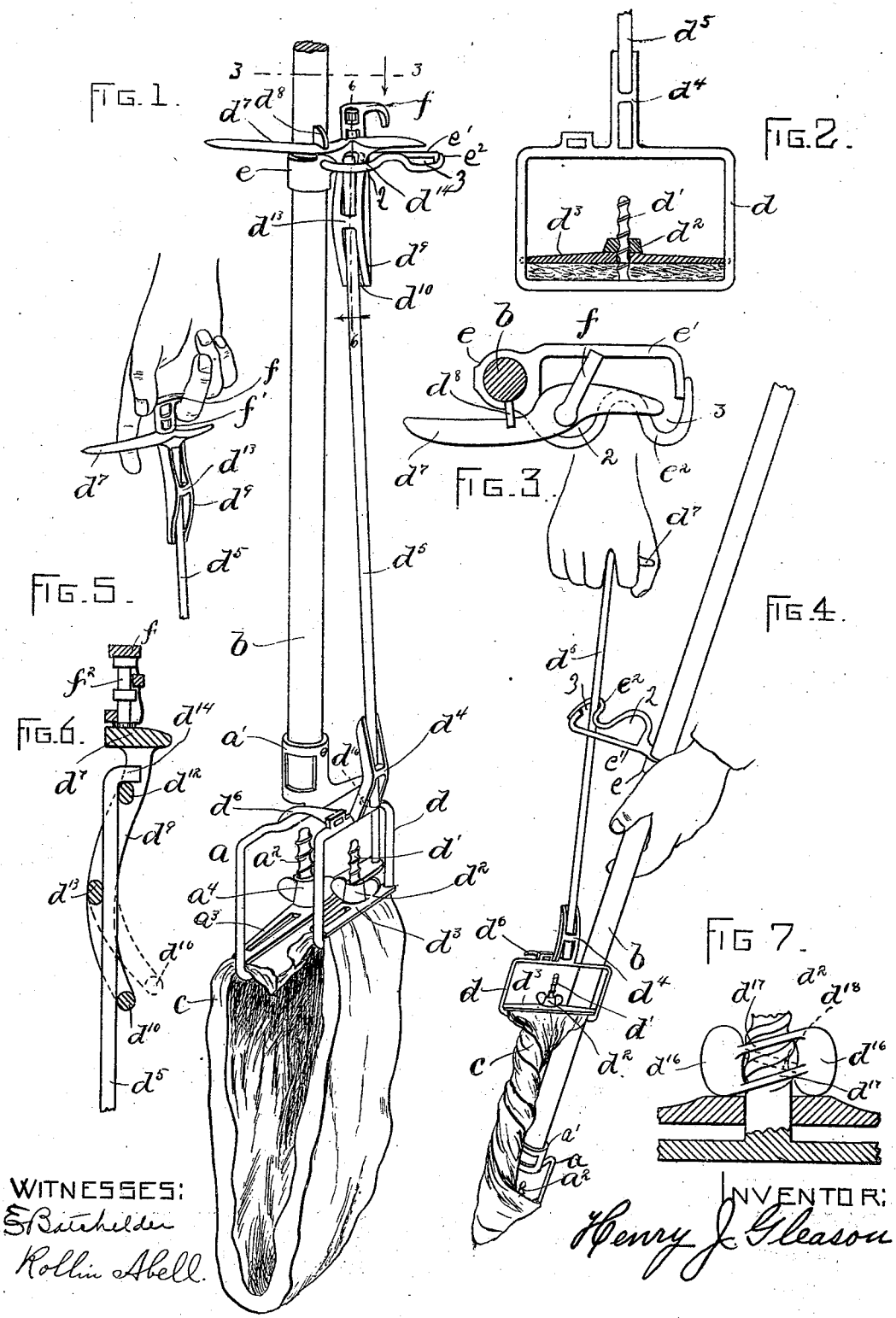
WITNESSES:
E. Batchelder
Rollin Abell
INVENTOR:
Henry J. Gleason

UNITED STATES PATENT OFFICE.

HENRY J. GLEASON, OF ARLINGTON, MASSACHUSETTS.

COMBINED MOP HEAD AND WRINGER.

SPECIFICATION forming part of Letters Patent No. 551,625, dated December 17, 1895.

Application filed February 27, 1894. Serial No. 501,748. (Model.)

*To all whom it may concern:*

Be it known that I, HENRY J. GLEASON, of Arlington, in the county of Middlesex and State of Massachusetts, have invented certain new and useful Improvements in Mops, of which the following is a specification This invention relates to mops having wringing attachments; and it has for its object to provide a combined mop holder and wringer adapted to be conveniently secured and held in its operative position, the mop being ready for use, and to be conveniently adjusted for the purpose of wringing the mop.

The invention consists of the several improvements which I will now proceed to describe and claim.

Of the accompanying drawings, forming a part of the specification, Figure 1 represents a perspective view of my improved mop, the wringing attachment being adjusted in position to hold the mop-cloth in condition for use. Fig. 2 represents a side view and partial section of the mop-clamping device of the wringer attachment. Fig. 3 represents a section from line 3 3, Fig. 1, and the top view of the parts below said line. Fig. 4 represents a perspective view showing the wringing attachment in the operation of wringing the mop. Fig. 5 represents a perspective view showing the preliminary operation of twisting the mop preparatory to forcibly wringing it. Fig. 6 represents a section on line 6 6, Fig. 1. Fig. 7 represents a perspective view of a portion of the device.

The same letters and numerals of reference indicate the same parts in all of the figures.

In the drawings, $a$ represents a mop-head having a sleeve or socket $a'$, which is secured to a handle $b$, the mop-head comprising a suitable frame, to the bottom cross-bar of which is affixed a screw-threaded stud $a^2$ and an independent movable clamping-bar $a^3$, adapted to co-operate with the bottom cross-bar of said frame in clamping the mop-cloth, the said clamp $a^3$ having a central hole which receives and is adapted to slide upon the stud $a^2$, the latter having a clamping-nut $a^4$, which is adapted to press the clamp $a^3$ against the portion of the mop-cloth interposed between it and the bottom cross-bar of the mop-head.

The mop-wringing attachment comprises a frame $d$, the bottom cross-bar of which has a screw-threaded stud $d'$, upon which is a clamping-nut $d^2$, which co-operates with a clamping-bar $d^3$ and the bottom cross-bar of the frame $d$ in securing one end of the mop-cloth $c$, the said frame $d$ having an arm $d^4$, to which the operating rod or handle $d^5$ is secured, and a hook or finger $d^6$ which engages the upper cross-bar of the frame or mop-head $a$. To the upper end of the rod $d^5$ is secured a handle $d^7$, which extends crosswise of the rod, and is adapted to be grasped by the operator, as shown in Fig. 4, to rotate the clamping-frame $d$. When the wringing attachment is adjusted to hold the mop in its operative position, as shown in Fig. 1, the handle $d^7$ is forced under the hook or lug $d^8$, formed on a collar $e$ affixed to the mop-handle $b$, the hook $d^6$ on the frame $d$ being at the same time caused to bear upon the upper cross-bar of the frame $a$, so that said cross-bar and the hook $d^8$ co-operate with the hook $d^6$ and handle $d^7$ in preventing an endwise movement of the wringing attachment, the hook $d^8$ preventing movement in one direction and the cross-bar of the frame $a$ preventing movement in the opposite direction. The wringing attachment is thus held in the position shown in Fig. 1, so that the mop is in position for use.

$e$ represents a collar affixed to the mop-handle $b$ and provided with arms $e'$ $e^2$, which project from one side of the mop-handle and form a space through which the rod $d^5$ of the wringer attachment passes. The arm $e^2$ is curved, as shown clearly in Fig. 2, to form recesses 2 and 3. The recess 2 is arranged so that when the wringer attachment is in the position shown in Fig. 1 the rod $d^5$ is located in the recess 2, the handle $d^7$ bearing against the upper side of the arm $e^2$.

When it is desired to wring the mop, the handle $d^7$ is disengaged from the hook $d^8$ and is moved outwardly into the outer recess 3, as shown in Fig. 4, the portion of the arm $e^2$ forming said recess 3 serving as a rest or bearing for the rod $d^5$ during the operation of wringing the mop, said rest or bearing projecting sufficiently from the mop-handle $b$ to enable the frame $d$ of the wringer to rotate without striking the mop-handle.

$f$ represents a finger-hook formed on a sleeve $f'$, which is journaled to rotate loosely upon a stud $f^2$ formed on the handle $d^7$. The object of said hook $f$ is to enable the operator to quickly twirl or rotate the rod $d^5$ for the purpose of twisting the mop-cloth preparatory to forcibly wringing the same, the operator holding the hook $f$ with one finger, as shown in Fig. 5, while thus twirling the rod $d^5$ with another finger, the mop being thus quickly prepared for the forcible ringing, which is effected by grasping the handle $d^7$, as shown in Fig. 4. The handle $d^7$ is provided with a shank $d^9$, composed of two side bars connected at their lower ends by cross-bar $d^{10}$ and at their upper ends by cross-bar $d^{12}$, and at an intermediate point by cross-bar $d^{13}$. Said shank $d^9$ is made of malleable metal and was originally formed substantially as indicated by dotted lines in Fig. 6. The upper end of the rod $d^5$ is bent to form a hook $d^{14}$, formed to engage the cross-bar $d^{12}$, the cross-bar $d^{13}$ being located at the opposite sides of rod $d^5$ from the cross-bars $d^{10}$ and $d^{12}$. The object of this construction is to permit the rod $d^5$ and the handle $d^7$ to be quickly connected without the use of rivets, this being accomplished by engaging hook $d^{14}$ with the cross-bar $d^{12}$, while the shank $d^9$ is in the form indicated by the dotted lines in Fig. 6, and then bending the lower portion of the shank inwardly to bring the cross-bar $d^{10}$ against the rod $d^5$ and force said rod against the cross-bar $d^{13}$.

The shank $d^4$ of the frame $d$ has the same form as the shank $d^9$ above described, and is engaged with the rod $d^5$ in the same way, said rod having a hook $d^{16}$ formed on its lower end and engaged with one of the cross-bars of the shank $d^4$. The nut $d^2$ is preferably composed of two wings or side pieces $d^{16}$ $d^{16}$ and three ribs $d^{17}$ $d^{17}$ and $d^{18}$, the ribs $d^{17}$ being at one side of the screw $d'$ and the rib $d^{18}$ at the opposite side. Said ribs are inclined to engage the screw-thread, as shown in Fig. 7. This form of nut is adapted to be made by casting, no machine-work being required.

Having thus explained the nature of my invention and described a way of constructing and using the same, though without attempting to set forth all of the forms in which it may be made or all of the modes of its use, what I claim, and desire to secure by Letters Patent, is—

1. The combination of the mop-head $a$ having a clamping device, the handle $b$ having a collar, the hook $d^8$ on said collar, and the wringer attachment comprising the head or frame $d$ having a clamping device, the hook $d^6$ arranged to engage the head $a$, and the rod $d^5$ having the handle $d^7$ arranged to engage the hook $d^8$, substantially as and for the purpose specified.

2. The combination of the mop-head $a$ having a clamping device, the handle $b$ having a collar, the hook $d^8$ on said collar, and arms $e'$ $e^2$, the latter having the recesses 2 3, and the wringer attachment comprising the head or frame $d$ having a clamping device, the hook $d^6$ arranged to engage the head $a$, and the rod $d^5$ having the handle $d^7$ arranged to engage the hook $d^8$, said rod being located between the arms $e'$ $e^2$ and adapted to occupy either of the recesses 2 3, substantially as and for the purpose specified.

3. The combination with the mop head and its handle of the wringer attachment comprising the head, having a clamping device, the rod $d^5$ affixed to said head, the handle $d^7$ affixed to said rod, and the finger hook loosely mounted on said handle, substantially as and for the purpose specified.

4. The combination of the rod $d^5$ having a hook such as $d^{14}$, a malleable shank such as $d^9$ having cross-bars $d^{14}$, $d^{10}$ at one side of the shank, and a cross-bar $d^{13}$ at the opposite side of the shank, and a device such as a handle $d^7$ connected by said shank to the rod $d^5$, substantially as and for the purpose specified.

HENRY J. GLEASON.

Witnesses:
FREDK. E. FOWLE,
CASSIUS M. HALL.